United States Patent
Walder et al.

(10) Patent No.: US 8,527,181 B2
(45) Date of Patent: Sep. 3, 2013

(54) METHOD FOR AUTOMATICALLY CONTROLLING AN INTERNAL COMBUSTION ENGINE

(75) Inventors: Michael Walder, Ravensburg (DE); Robby Gerbeth, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 389 days.

(21) Appl. No.: 12/956,336

(22) Filed: Nov. 30, 2010

(65) Prior Publication Data

US 2011/0130944 A1    Jun. 2, 2011

(30) Foreign Application Priority Data

Nov. 30, 2009   (DE) .................. 10 2009 056 381

(51) Int. Cl.
*B60T 7/12*   (2006.01)
*G05D 1/00*   (2006.01)
*G06F 7/00*   (2006.01)
*G06F 17/00*  (2006.01)

(52) U.S. Cl.
USPC .......... 701/103; 701/104; 701/105; 123/447; 123/456; 123/478; 123/488

(58) Field of Classification Search
USPC ............ 123/456, 458, 446, 447, 478–480, 123/488; 701/102–105, 114, 115; 73/114.43, 73/114.49, 114.51
See application file for complete search history.

(56) References Cited

U.S. PATENT DOCUMENTS

| | | | | |
|---|---|---|---|---|
| 6,994,074 | B2 * | 2/2006 | Doelker | 123/319 |
| 7,272,486 | B2 * | 9/2007 | Speetzen et al. | 701/105 |
| 7,305,972 | B2 * | 12/2007 | Kloos et al. | 123/479 |

FOREIGN PATENT DOCUMENTS

| | | |
|---|---|---|
| DE | 10344181 A1 | 4/2005 |
| DE | 102004006896 A1 | 9/2005 |
| DE | 102006007365 B3 | 5/2007 |
| DE | 102006034513 B3 | 10/2007 |
| DE | 102007030713 A1 | 1/2009 |
| DE | 102007045606 B3 | 2/2009 |
| JP | 2009057926 A * | 3/2009 |
| JP | 2009074535 A * | 4/2009 |
| JP | 2009074536 A * | 4/2009 |

* cited by examiner

*Primary Examiner* — Stephen K Cronin
*Assistant Examiner* — Joseph Dallo
(74) *Attorney, Agent, or Firm* — Lucas & Mercanti, LLP; Klaus P. Stoffel (57) ABSTRACT

A a method for automatically controlling an internal combustion engine, in which an individual accumulator pressure (pE) of a common rail system is detected in a measurement interval and stored; in which an evaluation window is determined for the stored individual accumulation pressure (pE), within which window an injection was brought about; in which, in a first step, both a representative injection start and a trial injection end are determined in this evaluation window as a function of the detected pressure values, and, in a second step, both a trial injection start and a representative injection end are determined in this evaluation window as a function of the detected pressure values; in which the representative injection start is checked for plausibility against the trial injection start; and in which the representative injection end is checked for plausibility against the trial injection end.

12 Claims, 6 Drawing Sheets

METHOD FOR AUTOMATICALLY CONTROLLING AN INTERNAL COMBUSTION ENGINE

BACKGROUND OF THE INVENTION:

The invention concerns a method for automatically controlling an internal combustion engine, in which an individual accumulator pressure of a common rail system is detected in a measurement interval and stored, and a start of injection and an end of injection are determined on the basis of the stored pressure values of the individual accumulator.

A common rail system with individual accumulators is disclosed by DE 103 44 181 A1. A common rail system with individual accumulators differs from a conventional common rail system in that the fuel to be injected is taken directly from the individual accumulator and not from the rail. During the injection pause, just the right amount of fuel flows back into the individual accumulator from the rail, so that the individual accumulator is again full at the start of the next injection. In the method described in DE 103 44 181 A1, an injection end is determined from the individual accumulator pressure values that have been detected and stored, and a virtual start of injection is then determined from the end of injection by a mathematical function, for example, a straight line. The virtual start of injection is then set as the actual start of injection for the further automatic control of the internal combustion engine. Since the raw values of the individual accumulator pressure are used in this method, the interfering frequencies present in the system are superposed on the measuring signal. This can cause an incorrect interpretation of the end of injection and bring about a virtual start of injection that deviates from the ideal state. Therefore, this method is still unsatisfactory with respect to accuracy.

DE 10 2004 006 896 A1 discloses a method for evaluating an injector that employs the method described in DE 103 44 181 A1 to determine a virtual injection start. In this method, the end of injection is compared with a setpoint injection end, and the virtual injection start is compared with a setpoint injection start. If their deviation falls within a tolerance range, the injector is evaluated as accurate. If the deviation is too great, the injector is rated inaccurate, and either its control parameter is adjusted or this is deactivated. Of course, the previously described problems with respect to accuracy also apply here.

SUMMARY OF THE INVENTION

Therefore, the objective of the invention is to provide a method for an internal combustion engine with a common rail system as well as individual accumulators that allows more precise determination of the start of injection and the end of injection.

The method includes using the individual accumulator pressure values stored in the measurement interval to determine an evaluation window within which an injection was brought about. The term injection as used in the present invention is understood to mean both an individual injection and a multiple injection in the form of a preinjection, a main injection and a post-injection. For example, if the evaluation window of the preinjection was determined, then in a first step, both a representative injection start and a trial injection end are determined in this evaluation window. In a second step, both a trial injection start and a representative injection end are then determined in this evaluation window. The representative injection start is then checked for plausibility against the trial injection start, and the representative injection end is checked for plausibility against the trial injection end.

A plausible injection start is set as controlling for the further automatic control of the internal combustion engine, for example, as an input variable for an injection delay input-output map by which the energization duration of an injector is adjusted. Correspondingly, a plausible injection end is set as an input variable for a closure delay input-output map. If the start of injection is automatically controlled, and the end of injection is automatically controlled, then a plausible injection start or a plausible injection end represents the controlled variable in this closed-loop control system. An injection start or an injection end that is not plausible is rejected, and, if a closed-loop control system for the start of injection or a closed-loop control system for the end of injection is being used, a change is subsequently made to an open-loop operation.

In the method described here, it is advantageous that precisely in the case of multiple injections, even small amounts of fuel can be adjusted. Change in the injectors in the course of the operating time, i.e., aging, can also be detected by the method and compensated. Since the method is redundant in itself, it is stable. If the rail pressure sensor fails, the method described here guarantees continued operation of the internal combustion engine.

DETAILED DESCRIPTION OF THE INVENTION

Figure 1:
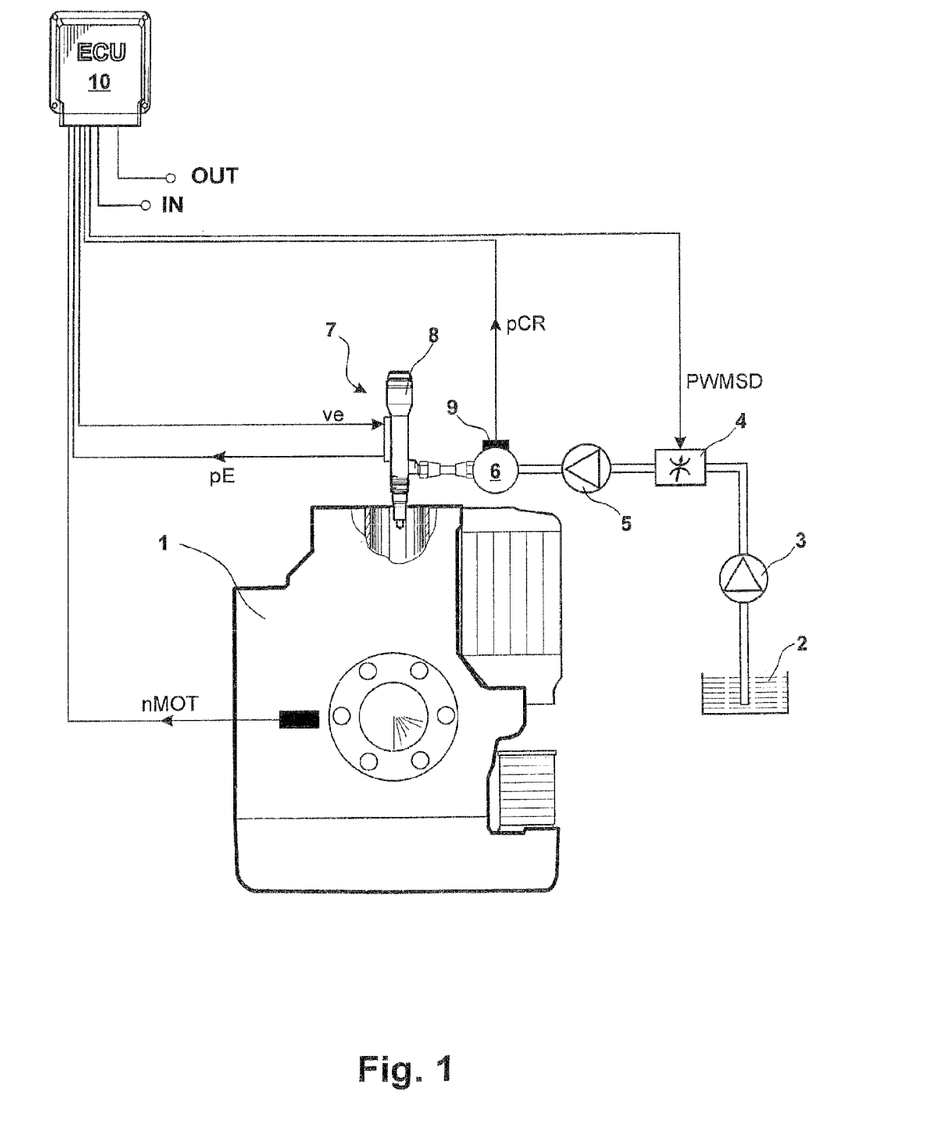
FIG. 1 shows a system diagram.

FIG. 1 shows a system diagram of an electronically controlled internal combustion engine 1 with a common rail system along with individual accumulators. The common rail system comprises the following mechanical components: a low-pressure pump 3 for pumping fuel from a fuel tank 2; a variable suction throttle 4 on the low-pressure side for controlling the fuel volume flow flowing through the lines; a high-pressure pump 5 for pumping the fuel at increased pressure; a rail 6 for storing the fuel; and injectors 7 for injecting the fuel into the combustion chambers of the internal combustion engine 1. An individual accumulator 8 is integrated in the injector 7 as an additional buffer volume. A common rail system with individual accumulators differs from a conventional common rail system in that the fuel to be injected is taken directly from the individual accumulator 8 and not from the rail 6. During the injection pause, just the right amount of fuel flows back into the individual accumulator 8 from the rail 6, so that the individual accumulator is again full at the start of the next injection.

The operating mode of the internal combustion engine 1 is determined by an electronic engine control unit (ECU) 10. The electronic engine control unit 10 contains the customary components of a microcomputer system, for example, a microprocessor, interface adapters, buffers, and memory components (EEPROM, RAM). Operating characteristics that are relevant to the operation of the internal combustion engine 1 are applied in the memory components in the form of input-output maps/characteristic curves. The electronic control unit 10 uses these to compute the output variables from the input variables. FIG. 1 shows the following input variables as examples: the rail pressure pCR, which is measured by means of a rail pressure sensor 9; an engine speed nMOT; an individual accumulator pressure pE; and an input variable IN, which represents additional sensor signals, for example, an accelerator signal or the charge air pressure of an exhaust gas turbocharger. FIG. 1 also shows the following as output variables of the electronic control unit 10: a PWM signal PWMSD for controlling the suction throttle 4 as a pressure regulator; a signal ye for controlling the injectors 7 (injection start/injection end); and an output variable OUT, which represents additional control signals for automatically controlling the internal combustion engine 1, for example, a control signal for activating a second exhaust gas turbocharger during a register supercharging.

Figure 2A:
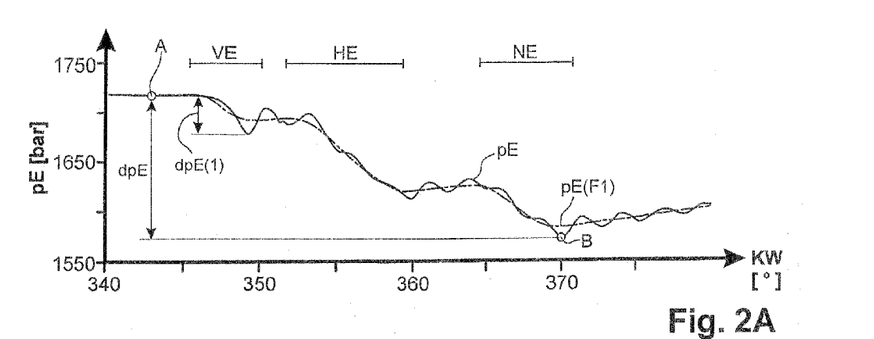
FIG. 2 shows a graph of a multiple injection.
Figure 2B:
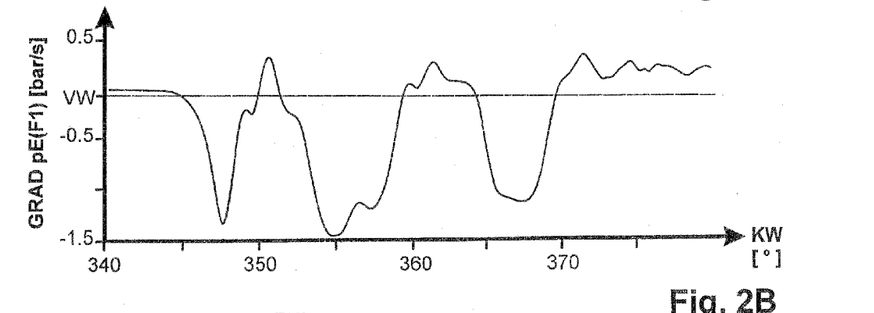
Figure 2C:
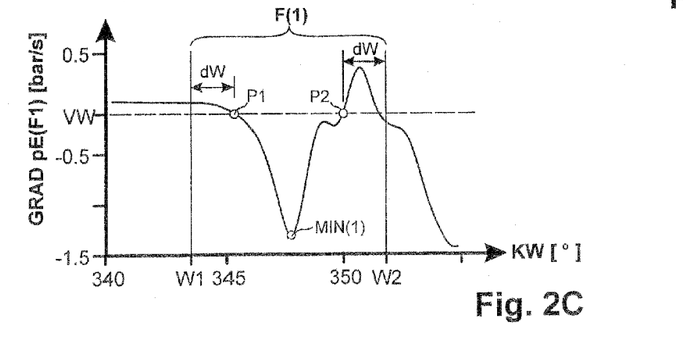

FIG. 2 shows graphs of multiple injection and comprises individual FIGS. 2A to 2C. The graphs show the individual accumulator pressure pE (FIG. 2A), the gradient variation GRAD pE(F1) of the filtered individual accumulator pressure (FIG. 2B), and an enlarged segment of the gradient variation GRAD pE(F1) (FIG. 2C), in each case as a function of the crank angle KW. FIG. 2A shows a preinjection VE, a main injection HE, and a post-injection NE. The solid line shows the individual accumulator pressure pE, and the broken line shows the filtered individual accumulator pressure pE(F1). FIGS. 2B and 2C show the gradient variation of the filtered individual accumulator pressure as a solid line, while the broken line parallel to the x-axis represents a setpoint value VW.

In a measurement interval, the pressure distribution of the individual accumulator pE is recorded. In practice, the measurement interval corresponds to an operating cycle of the internal combustion engine. For reasons of better clarity, a measurement interval in the range of 340° to 375° crank angle is shown in FIG. 2A. in this measurement interval, the maximum value, point A, and the minimum value, point B, of the recorded individual accumulator pressure pE are determined, and the difference dpE is computed. The difference dpE is used to determine a first filter cutoff frequency fG1 by means of a first characteristic curve KL1 (see FIG. 3). This filter cutoff frequency fG1 is then used to filter the pressure distribution of the individual accumulator pE (dot-dash line pE(F1) in FIG. 2A). The filtered individual accumulator pressure pE(F1) is then used to compute the gradient variation GRAD pE(F1) (FIG. 2B). The gradient variation GRAD pE(F1) is then used to determine an evaluation window for each injection. In FIG. 2C, the first window F(1), i.e., the evaluation window of the preinjection VE, is shown as an enlarged segment. Within the evaluation window F(1), the minimum MIN(1) is determined as a reference point. Starting from this minimum MIN(1), in the crank angle range before the minimum MIN(1), i.e., towards smaller crank angles, in a first step, the point at which the gradient variation GRAD pE(F1) equals the setpoint value VW is determined. This corresponds to the point P1 in FIG. 2C. In a second step, a derivative action dW, for example, dW=3° crank angle, is deducted from the crank angle corresponding to point P1, which in the present case is 345°. This corresponds to the crank angle W1, which is the first boundary of the evaluation window F(1). Starting again from the minimum MIN(1), in the crank angle range after the minimum MIN(1), i.e., towards larger crank angles, in a first step, the point at which the gradient variation GRAD pE(F1) equals the setpoint value VW is determined. This corresponds to the point P2 in FIG. 2C. In a second step, the derivative action dW is added to the crank angle corresponding to point P2, which in the present case is 350°. This corresponds to the crank angle W2, which is the second boundary of the evaluation window F(1). Therefore, the evaluation window F(1) of the preinjection VE corresponds to the crank angle range from W1 to W2. The evaluation window for the main injection HE and the evaluation window for the postinjection NE are then computed in analogous fashion.

Figure 3:
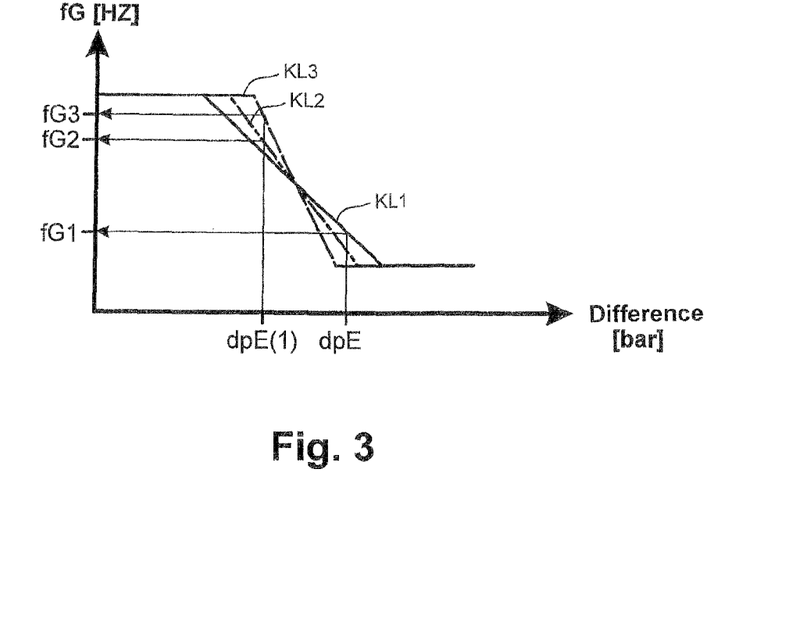
FIG. 3 shows a family of characteristic curves for determining the filter cutoff frequency.

FIG. 3 shows a family of characteristic curves for determining the filter cutoff frequencies. The input variable is the difference of the individual accumulator pressure pE. The output variable is the filter cutoff frequency fG for the filtering of the individual accumulator pressure pE. Three characteristic curves KL1 to KL3 are shown. A first characteristic curve KL1 is used in the determination of the evaluation windows. If the difference is, for example, dpE=150 bars (see FIG. 2A), then a first filter cutoff frequency fG1=2200 Hz is computed by means of the first characteristic curve KL1. A second characteristic curve KL2 is used in the determination of the representative injection start and the trial injection end. If the difference is dpE=dpE(1) (see FIG. 2A), then a second filter cutoff frequency fG2 is computed by means of the second characteristic curve KL2. The third characteristic curve KL3 is used in the determination of the trial injection start and the representative injection end. If the difference is dpE=dpE(1), then a third filter cutoff frequency fG3 is computed by means of the second characteristic curve KL3. A more exact explanation of when the second filter cutoff frequency fG2 and the third filter cutoff frequency fG3 are used is given below with reference to FIG. 4.

Figure 4:
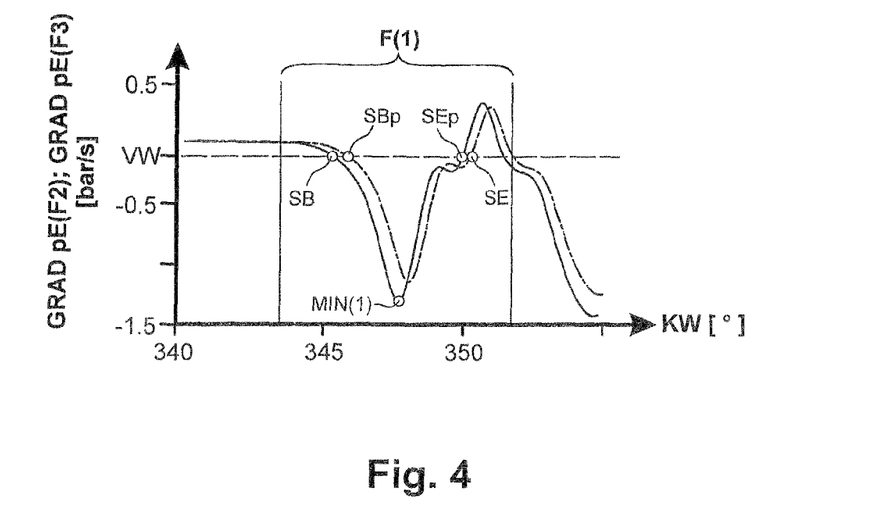
FIG. 4 shows a graph.

FIG. 4 shows the gradient variation of the filtered individual accumulator pressure as a function of the crank angle KW. The solid line denotes a gradient variation GRAD pE(F2) obtained when the individual accumulator pressure pE is filtered with the second filter cutoff frequency fG2. The broken line denotes a gradient variation GRAD pE(F3) obtained when the individual accumulator pressure pE is filtered with the third filter cutoff frequency fG3. The central idea here is to filter the individual accumulator pressure pE in the evaluation window with the second filter cutoff frequency fG2 and then to filter the individual accumulator pressure with the third filter cutoff frequency fG3 and to determine the characteristics of the injection, in other words, the start of injection and the end of injection, from the respective gradient variation.

In a first step, the maximum pressure and the minimum pressure are determined for the preinjection VE, and the pressure difference dpE(1) is computed (see FIG. 2A). The pressure difference dpE(1) is then used in a second step to determine the second filter cutoff frequency fG2 by means of the second characteristic curve KL2 (FIG. 3). In a third step, the individual accumulator pressure pE is filtered with the second filter cutoff frequency fG2, and the gradient variation GRAD pE(F2) is computed from this (see the solid line in FIG. 4). The minimum MIN(1) within the evaluation window F(1), here the evaluation window of the preinjection, is then determined in a fourth step. In a fifth step, starting from this minimum MIN(1), in the crank angle range before the minimum MIN(1), the point at which the gradient variation GRAD pE(F2) equals the setpoint value VW is determined. This point is the representative injection start SB. In a sixth step, again starting from the minimum MIN(1), in the crank angle range after the minimum MIN(1), the point at which the gradient variation GRAD pE(F2) equals the setpoint value VW is determined. This point is the trial injection end SEp. The representative injection start SB and the trial injection end SEp within the evaluation window F(1) are thus defined.

The individual accumulator pressure pE is then filtered with the third filter cutoff frequency fG3. The third filter cutoff frequency fG3 is computed from the difference dpE(1) by means of the third characteristic curve KL3. Proceeding as described above, the gradient variation GRAD pE(F3) is computed, the minimum is determined, the point before the minimum at which the gradient variation GRAD pE(F3) equals the setpoint value VW is determined, and the point after the minimum at which the gradient variation GRAD pE(F3) equals the setpoint value VW is determined. The point thus found before the minimum is the trial injection start SBp, and the point thus found after the minimum is the representative injection end SE. The representative injection start SB is then checked for plausibility against the trial injection start SBp, for example, by taking the quotient or the difference. If the difference is less than a limit, then the representative injection start is plausible and is set as controlling for the further automatic control of the internal combustion engine. Similarly, the representative injection end SE is checked for plausibility against the trial injection end SEp. If it is plausible, then the representative injection end SE is set as controlling, for example, as an input variable for a closure delay input-output map.

Figure 5:
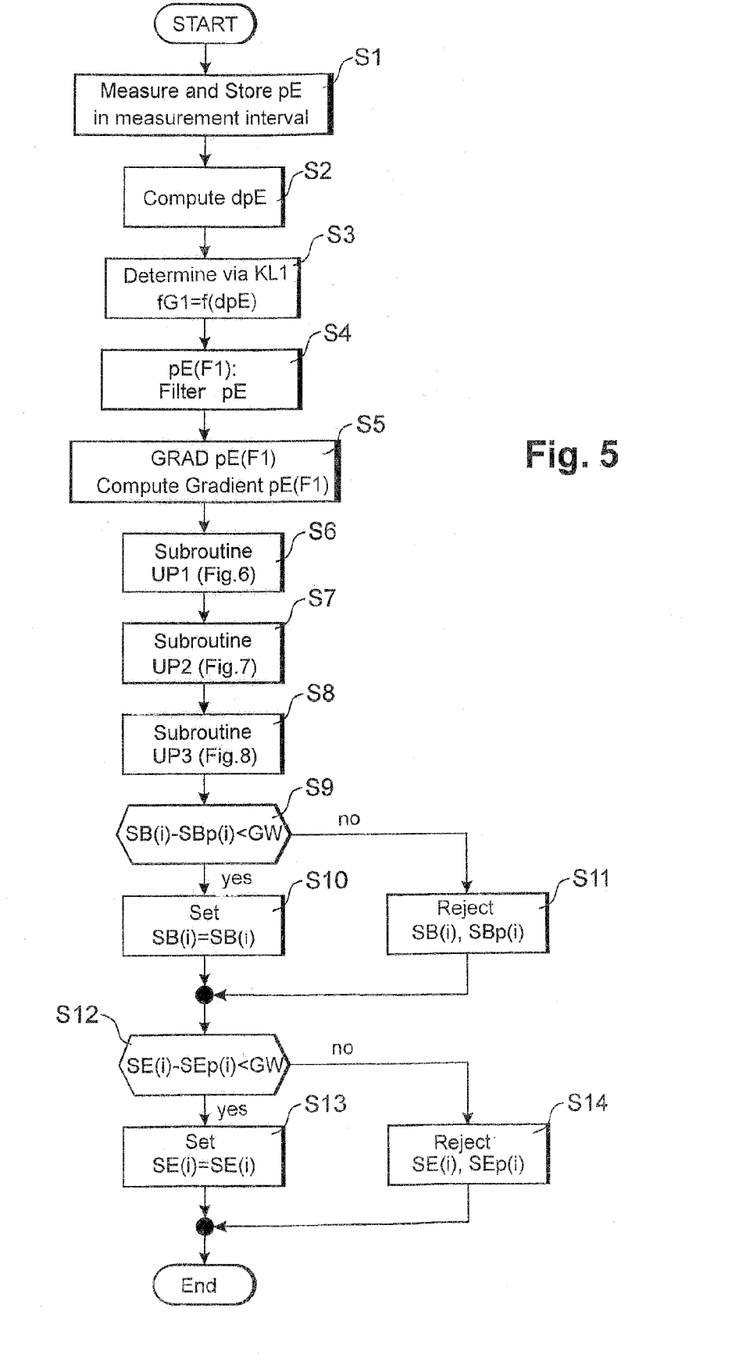
FIG. 5 shows a program flowchart (main program).
Figure 6:
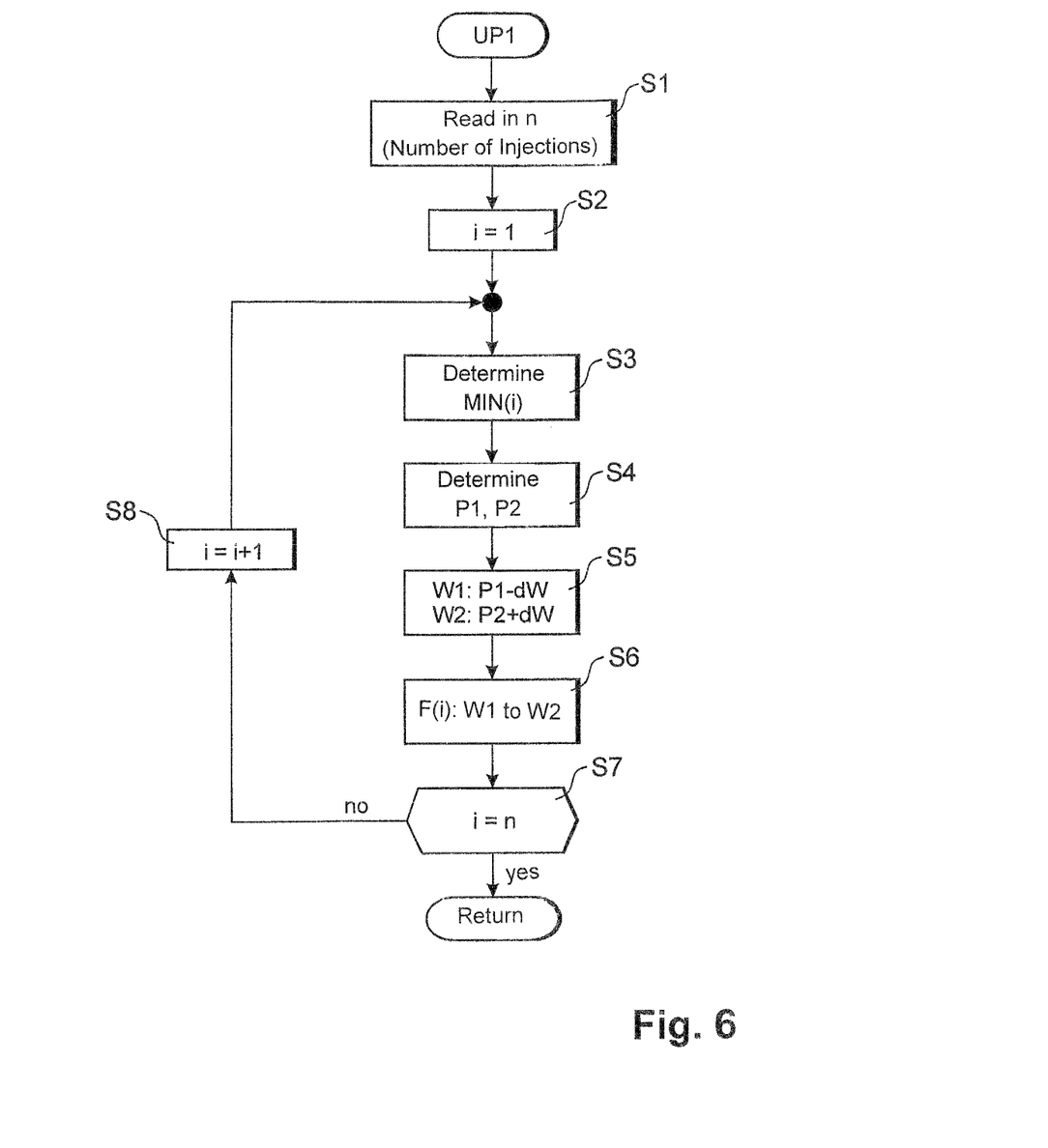
FIG. 6 shows a first subroutine.
Figure 7:
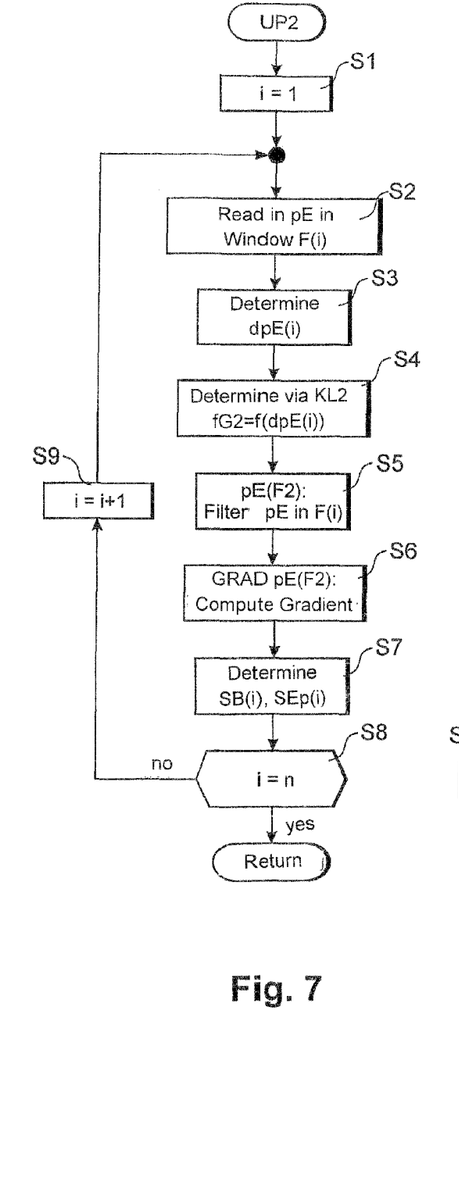
FIG. 7 shows a second subroutine.
Figure 8:
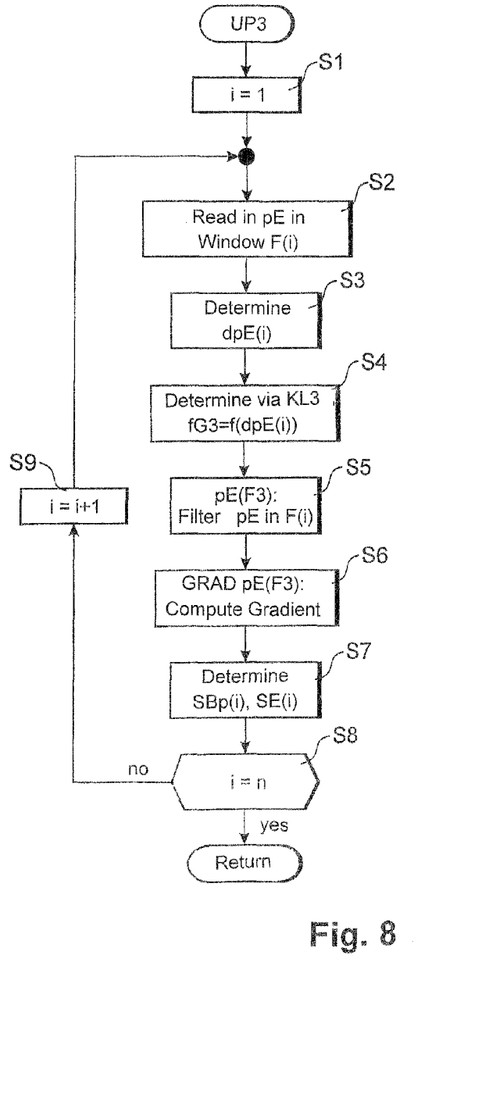
FIG. 8 shows a third subroutine.

FIG. 5 is a flowchart of the main program for the method. At SI the individual accumulator pressure is detected in the measurement interval and stored. The measurement cycle is understood to mean, for example, one operating cycle of the internal combustion engine, i.e., 0° to 720° crank angle. Naturally, instead of a range of crank angles, it is also possible to use a time frame. At S2 the maximum individual accumulator pressure and the minimum individual accumulator pressure are determined, and the difference dpE is computed (see FIG. 2A). At S3 the first filter cutoff frequency fG1 is determined as a function of the difference dpE by means of the first characteristic curve KL1 (FIG. 3). At S4 the distribution of the individual accumulator pressure pE is filtered with the first filter cutoff frequency fG1, and at S5 the gradient variation GRAD pE(F1) is computed from this. At S6 the program is routed to a first subroutine UP1, by which the evaluation windows are determined. The first subroutine UP1 is shown in FIG. 6 and will be described in conjunction with that figure. After the evaluation windows have been determined, the program is routed at S7 to a second subroutine UP2, by which a representative injection start and a trial injection end are determined within each evaluation window. The second subroutine UP2 is shown in FIG. 7 and will be described in conjunction with that figure. After the return from the second subroutine UP2, the program is routed at S8 to a third subroutine UP3, by which a trial injection start and a representative injection end are computed within each evaluation window. The third subroutine UP3 is shown in FIG. 8 and will be described in conjunction with that figure.

At S9 the representative injection start SB(i) is then checked for plausibility against the trial injection start SBp(i), for example, by taking the difference. If the difference is less than a limit GW (interrogation result S9: yes), then at S10 the representative injection start SB(i) of the evaluation window, for example, the evaluation window F(1) of the preinjection, is set as the controlling injection start SB(i) for this evaluation window. If the representative injection start SB(i) is not plausible (interrogation result S9: no), then at S11 the representative injection start SB(i) and the trial injection start SBp(i) of this evaluation window F(i) are rejected. At S12 the representative injection end SE(i) is then checked for plausibility against the trial injection end SEp(i) of this evaluation window F(i), for example, the evaluation window F(1) of the preinjection. If the difference is less than the limit GW (interrogation result S12: yes), then at S13 the representative injection end SE(i) is set as the controlling injection end SE(i). The term "set as controlling" means that the representative injection end SE(i) is an input variable of a closure delay input-output map. If, on the other hand, the injection end is automatically controlled, then the representative injection end SE(i) represents the controlled variable of this closed-loop control system. If the representative injection end SE(i) is not plausible, then at S14 the representative injection end SE(i) and the trial injection end SEp(i) are rejected. The program then ends.

FIG. 6 shows a first subroutine UP1 for determining the evaluation windows. At Si the number n of injections in the interval is read in. This can be one injection or a multiple injection. As shown in FIG. 2A, a multiple injection comprises a preinjection, a main injection, and a post-injection. Therefore, n =3. At S2 a running variable is set to the value i=1. Then at S3 the gradient variation GRAD pE(F1) is used to determine the minimum MIN(i), in this case MIN(1). At S4 the point P1 and the point P2 are determined. The point P1 corresponds to the point in the range of crank angles before the minimum MIN(i), i.e., towards smaller crank angles, at which the gradient variation GRAD pE(F1) equals the setpoint value VW minus the derivative action dW, for example, dW=3° crank angle. The point P2 corresponds to that point in the range of crank angles after the minimum MIN(i), i.e., towards larger crank angles, at which the gradient variation GRAD pE(F1) equals the setpoint value VW plus the derivative action dW. The crank angle W1 corresponds to point P1, and the crank angle W2 corresponds to point P2. The window F(i) is thus defined as the range of crank angles W1 to W2. At S7 a check is made to determine whether the evaluation windows of all injections have been computed, i.e., Whether i=n. If this is not the case (interrogation result S7: no), then at S8 the running variable i is increased by one, and at S3 the next evaluation window is determined. If, on the other hand, all of the evaluation windows have been determined (interrogation result S7: yes), the program returns to the main program of FIG. 5, where the next step S7 is executed.

FIG. 7 shows a second subroutine UP2 for determining a representative injection start SB(i) and a trial injection end SEp(i) within an evaluation window F(i). At Si a running variable i is set to the initial value i=1. At S2 the individual accumulator pressure pE within the time window F(i), in this case F(1), is read in, and at S3 the maximum and minimum pressure values are determined and their difference dpE(i) is computed. At S4 the second filter cutoff frequency fG2 is determined as a function of the pressure difference dpE(i) by means of the second characteristic curve KL2. At S5 the individual accumulator pressure pE is then filtered with the second filter cutoff frequency fG2. At S6 the gradient variation GRAD pE(F2) is computed from the filtered distribution pE(F2) of the individual accumulator pressure pE. At S7 the minimum in the gradient variation GRAD pE(F2) is then determined, and that point before the minimum at which the gradient variation GRAD pE(F2) equals the setpoint value VW is determined. This point is the representative injection start SB(i) in the window F(i). The point after the minimum at which the gradient variation GRAD pE(F2) equals the setpoint value VW is then determined. This point is the trial injection end SEp(i) in the window F(i). At S8 an interrogation determines whether the representative injection start SB(i) and the trial injection end SEp(i) have been determined for all injections n. If this is not the case (interrogation result S8: no), then the running variable i is increased by one. Otherwise, the program returns to the main program.

FIG. 8 shows a third subroutine UP3 for determining a trial injection start SBp(i) and a representative injection end SE(i) within an evaluation window F(i). At S1 a running variable i is set to the initial value i=1. At S2 the individual accumulator pressure pE within the time window F(i), in this case F(1), is read in, and at S3 the maximum and minimum pressure values are determined and their difference dpE(i) is computed. At S4 the third filter cutoff frequency fG3 is determined as a function of the pressure difference dpE(i) by means of the third characteristic curve KL3. At S5 the individual accumulator pressure pE is then filtered with the third filter cutoff frequency fG3. At S6 the gradient variation GRAD pE(F3) is computed from the filtered distribution pE(F3) of the individual accumulator pressure pE. At S7 the minimum in the gradient variation GRAD pE(F3) is then determined, and that point before the minimum at which the gradient variation GRAD pE(F3) equals the setpoint value VW is determined. This point is the trial injection start SBp(i) in the window F(i). The point after the minimum at which the gradient variation GRAD pE(F3) equals the setpoint value VW is then determined. This point is the representative injection end SE(i) in the window F(i). At S8 an interrogation determines whether the trial injection start SBp(i) and the representative injection end SE(i) have been determined for all injections n. If this is not the case (interrogation result S8: no), then the running variable i is increased by one. Otherwise, the program returns to the main program.

The invention claimed is:

1. A method for automatically controlling an internal combustion engine (1), comprising the steps of:
    detecting and storing an individual accumulator pressure (pE) of a common rail system in a measurement interval;
    determining an evaluation window (F(i)) for the stored individual accumulation pressure (pE), within which window an injection was brought about;
    determining, in a first step, both a representative injection start (SB) and a trial injection end (SEp) in the evaluation window (F(i)) as a function of the detected pressure values, and, in a second step, determining both a trial injection start (SBp) and a representative injection end (SE) in the evaluation window (F(i)) as a function of the detected pressure values;
    checking the representative injection start (SB) for plausibility against the trial injection start (SBp); and
    checking the representative injection end (SE) for plausibility against the trial injection end (SEp), including determining the evaluation window (F(i)) as follows: filtering the individual accumulator pressure (pE) with a first filer cutoff frequency (fG1); computing a gradient variation (GRAD pE(F1)) from the filtered individual accumulator pressure (pE(F1)); the minimum (MIN(i)) in the gradient variation (GRAD pE(F1)) of the injection; and, starting from the minimum (MIN(i)), setting a first crank angle (W1) before the minimum (MIN(i)) in a direction of smaller crank angles and a second crank angle (W2) after the minimum (MIN(i)) in a direction of larger crank angles as limiting values for the evaluation window (F(i)).

2. The method in accordance with claim 1, wherein the first crank angle (W1) corresponds to a crank angle, before the minimum (MIN(i)) in the direction of smaller crank angles, at which the gradient variation (GRAD pE(F1)) corresponds to a setpoint value (VW) minus a derivative action (dW).

3. The method in accordance with claim 1, wherein the second crank angle (W2) corresponds to a crank angle, after the minimum (MIN(i)) in the direction of larger crank angles, at which the gradient variation (GRAD pE(F1)) corresponds to a setpoint value (VW) plus a derivative action (dW).

4. The method in accordance with claim 1, including computing the representative injection start (SB) as follows: filtering the stored individual accumulator pressure (pE) with a second filter cutoff frequency (fG2) in the evaluation window (F(i)), and computing a gradient variation (GRAD pE(F2)) from this; determining a minimum (MIN(i)) in the gradient variation (GRAD pE(F2)) of the injection; starting from the minimum (MIN(i)), determining a first crank angle (W1), before the minimum (MIN(i)) in a direction of smaller crank angles, at which the gradient variation (GRAD pE(F2)) equals a setpoint value (VW); and setting this crank angle as the representative injection start (SB).

5. The method in accordance with claim 4, including determining the trial injection end (SEp) as follows: starting from the minimum (MIN(i)), determining a second crank angle (W2), after the minimum (MIN(i)) in a direction of larger crank angles, at which the gradient variation (GRAD pE(F2)) equals the setpoint value (VW); and setting this crank angle as the trial injection end (SEp).

6. The method in accordance with claim 4, including computing the trial injection start (SBp) as follows: filtering the stored individual accumulator pressure (pE) with a third filter cutoff frequency (fG3), and computing the gradient variation (GRAD pE(F3)) from this; determining a minimum (MIN(i)) in the gradient variation (GRAD pE(F3)) of the injection; starting from the minimum (MIN(i)), determining a first crank angle (W1), before the minimum (MIN(i)) in the direction of smaller crank angles, at which the gradient variation (GRAD pE(F3)) equals the setpoint value (VW); and setting this crank angle as the trial injection start (SBp).

7. The method in accordance with claim 6, including determining the representative injection end (SE) as follows: starting from the minimum (MING)), determining a second crank angle (W2), after the minimum (MIN(i)) in a direction of larger crank angles, at which the gradient variation (GRAD pE(F3)) equals the setpoint value (VW); and setting this crank angle as the representative injection end (SE).

8. The method in accordance with claim 1, including determining a maximum individual accumulator pressure and a minimum individual accumulator pressure in the measurement interval, computing a difference (dpE) between the maximum and minimum individual accumulator pressures, and computing the first filter cutoff frequency (fG1) as a function of the difference (dpE) by way of a first characteristic curve (KL1)

9. The method in accordance with claim 4, including computing the trial injection start (SBp) as follows: filtering the stored individual accumulator pressure (pE) with a third filter cutoff frequency (fG3), and computing the gradient variation (GRAD pE(F3)) from this; determining a minimum (MIN(i)) in the gradient variation (GRAD pE(F3)) of the injection; starting from the minimum (MIN(i)), determining a first crank angle (W1), before the minimum (MIN(i)) in the direction of smaller crank angles, at which the gradient variation (GRAD pE(F3)) equals the setpoint value (VW); and setting this crank angle as the trial injection start (SBp), further including determining a maximum individual accumulator pressure and a minimum individual accumulator pressure in the evaluation window (F(i)), computing a difference (dpE(i)) between the maximum and minimum individual accumulator pressures, computing the second filter cutoff frequency (fG2) as a function of the difference (dpE(i)) by way of a second characteristic curve (KL2), and computing a third filter cutoff frequency (fG3) as a function of the difference (dpE(i)) by way of a third characteristic curve (KL3).

10. The method in accordance with claim 1, including setting a plausible injection start and/or a plausible injection end as controlling for further automatic control of the internal combustion engine (1), and rejecting at least one of an injection start that is not plausible and an injection end that is not plausible.

11. The method in accordance with claim 10, wherein the injection start that is set as controlling is an input variable of an injection delay input-output map, and the injection end that is set as controlling is an input variable of a closure delay input-output map.

12. The method in accordance with claim 10, wherein the injection start that is set as controlling corresponds to the controlled variable of a closed-loop control system for the start of injection, and the injection end that is set as controlling corresponds to the controlled variable of a closed-loop control system for the end of injection.

* * * * *